UNITED STATES PATENT OFFICE.

IWAN OSTROMISLENSKY, OF PETROGRAD, RUSSIA, ASSIGNOR, BY MESNE ASSIGNMENTS, TO NEW YORK BELTING AND PACKING COMPANY, A CORPORATION OF NEW YORK.

PROCESS FOR VULCANIZING RUBBER AND PRODUCT OBTAINED THEREBY.

1,342,457.   Specification of Letters Patent.   Patented June 8, 1920.

No Drawing.   Application filed July 29, 1916. Serial No. 112,187.

*To all whom it may concern:*

Be it known that I, IWAN OSTROMISLENSKY, a subject of the Czar of Russia, residing at Petrograd, Russia, have invented certain new and useful Improvements in Processes for Vulcanizing Rubber and Products Obtained Thereby, of which the following is a full, clear, and exact description.

This invention relates to processes for vulcanizing rubber or similar material, such as gutta-percha, balata, synthetic rubber, and materials commonly classed under the term "rubber," and to the products obtained thereby.

It is more particularly adapted to a process in which the destructive action of sulfur or sulfur compounds upon coloring material may be substantially or wholly eliminated and in which vulcanization may be carried out at relatively low temperatures.

The peroxids and peracids have been found to be applicable in effecting cold vulcanization. The process employing such substances is preferably carried out as follows:—20 grams of natural rubber are mixed with 4-20% of benzoyl peroxid, the mixture being accomplished at normal temperature. The mixture is given a careful preliminary warming at a temperature below 100° C., preferably from 30 to 80° C. for a period varying from ten to forty minutes in the absence of air. Upon standing at normal temperature vulcanization becomes complete.

Vulcanization at a temperature below 212° F. may be also secured through the use of tri-nitro-benzene. This process is preferably carried out by mixing 50 grams of natural rubber, 2 grams of 1.3.5.-tri-nitro-benzene, 1 gram of naphthylamin, and 10 grams of lead oxid. The mixture is carried out on hot rolls or on cold rolls and then subsequently subjected to a preliminary warming from 50 to 60° C. Upon allowing this mixture to stand vulcanization takes place.

Vulcanization without the application of heat at a temperature below 212° F. may be also carried out by using sulfur alone, thereby eliminating the present practice of using sulfur chlorid. The process is preferably carried out as follows:—50 grams of natural rubber are mixed on hot rolls at 60 to 70° C., 0.5 gram of piperidinepiperidyldithiocarbamate, 2.5 grams of flowers of sulfur and from 5 to 10 grams of lead oxid. Rolling is continued from twenty-five to thirty-five minutes. The resulting mixture may be shaped and is kept in a mold at ordinary temperature for three days, within which time vulcanization becomes complete. The piperidinepiperidyldithiocarbamate may be replaced by other aliphatic amins. For example isoamylamin, hexamethyleneamin, or hexamethyleneaminedithiocarbamate.

One object of the invention is to provide a simple and efficient process which shall prevent injury to various types of coloring material such as organic dyes heretofore injured by the vulcanizing process.

Another object of the invention is to provide a simple and efficient process for conducting vulcanization at temperatures preferably below 212° F.

Another object is to provide a series of products, in accordance with the processes mentioned, having desirable physical characteristics in general and particularly exhibiting the colors of various dyes heretofore unusable in such connection, due to the destructive action of vulcanization.

Coloring of rubber has heretofore been reproduced with mineral colors and a limited number of organic dyes unaffected by the action of sulfur at the vulcanization temperature. I have discovered that the various colors including organic dyes may be protected against the destructive action of sulfur during vulcanization by means of an agent such as methylene base, *e. g.* piperidinepiperidyldithiocarbamate, such agent serving to lower the normal temperature of vulcanization while maintaining the temperature constant. The methylene base has substantially no injurious effect upon the dye itself.

The organic dyes are preferably added to a vulcanizable mixture comprising rubber, sulfur, amin, and a metallic oxid. In carrying out the process 10 grams of rubber are preferably mixed with three grams of erythrosin, 2 grams of zinc oxid, 0.8 gram of sulfur, and 0.2 gram of piperidinepiperidyldithiocarbamate. The mass is thoroughly mixed at normal temperature and is heated in a mold at 140° C. without access of air for ten minutes. The product has a raspberry red color. The original mixture heated to 50-55° C. for fifteen hours produced substantially identical results with the first lot mentioned. The original mixture vulcanized at 140° C. three days after the original milling, vulcanized within 1½ to 2 minutes.

Vulcanization with eosin, alkali-blue and cinnamylidenefluorene, is preferably carried on at normal temperature. For example, 3 grams of eosin or cinnamylidenefluorene are mixed with 10 grams of rubber, 0.8 gram of sulfur, 0.2 gram of piperidinepiperidyldithiocarbamate serving to lower the required temperature of vulcanization. The mixture if left in the mold at ordinary temperature vulcanizes completely within one month. Piperidinepiperidyldithiocarbamate serves to prevent injury to erythrosin or other dye, due to the action of sulfur, during the vulcanizing process. This protective action appears to be due in part at least to the lowering of the temperature of vulcanization together with the acceleration of vulcanization due to piperidinepiperidyldithiocarbamate and zinc oxid both of which are known as accelerators.

The products and procedures enumerated have been found to possess in general the desirable characteristics enumerated as the objects above.

As many apparently widely different embodiments of this invention could be made without departing from the spirit thereof, it is to be understood that I do not intend to limit myself to the specific form of the invention as set forth except as indicated in the appended claims.

Having thus described my invention what I claim and desire to protect by Letters Patent is:

1. A process for treating rubber or similar material which comprises adding thereto a coloring material a vulcanizing agent normally tending to injure the coloring material under vulcanizing conditions and an agent itself having no injurious effect upon the coloring material and adapted to prevent injury by said vulcanizing material and inducing vulcanization to take place.

2. A process for treating rubber or similar material which comprises adding thereto a coloring material a vulcanizing agent normally tending to injure the coloring material under vulcanizing conditions and a base itself having no injurious effect upon the coloring material and adapted to prevent injury by said vulcanizing material and inducing vulcanization to take place.

3. A process for treating rubber or similar material which comprises adding thereto a coloring material a vulcanizing agent normally tending to injure the coloring material under vulcanizing conditions and a methylene base itself having no injurious effect upon the coloring material and adapted to prevent injury by said vulcanizing material and inducing vulcanization to take place.

4. A process for treating rubber or similar material which comprises adding thereto an organic coloring material a vulcanizing agent normally tending to injure organic coloring material under vulcanizing conditions and an agent itself having no injurious effect upon the coloring material and adapted to prevent injury by said vulcanizing material and inducing vulcanization to take place.

5. A process for treating rubber or similar material which comprises adding thereto a dye, a vulcanizing agent normally tending to injure the coloring material under vulcanizing conditions and an agent itself having no injurious effect upon the coloring material and adapted to prevent injury by said vulcanizing material and inducing vulcanization to take place.

6. A process for treating rubber or similar material which comprises adding thereto sulfur, a coloring material normally injured by the sulfur under vulcanizing conditions and an agent itself having no injurious effect upon the coloring material and adapted to prevent injury by said sulfur and inducing vulcanization to take place.

7. A process for treating rubber or similar material which comprises adding thereto sulfur, an organic dye normally injured by said sulfur under vulcanizing conditions and an agent itself having no injurious effect upon the coloring material and adapted to prevent injury by said sulfur and inducing vulcanization to take place.

8. A process for treating rubber or similar material which comprises adding thereto sulfur, an organic dye normally injured by said sulfur under vulcanizing conditions and a methylene base itself having no injurious effect upon the coloring material and adapted to prevent injury by said vulcanizing material and inducing vulcanization to take place.

9. A process for treating rubber or similar material which comprises adding thereto sulfur, an organic dye normally injured by said sulfur under vulcanizing conditions, an agent itself having no injurious effect upon the coloring material and adapted to prevent injury by said sulfur and a metallic oxid serving as an accelerator and inducing vulcanization to take place.

10. A process for treating rubber or similar material which comprises adding thereto sulfur, an organic dye normally injured by said sulfur and zinc oxid and inducing vulcanization to take place.

11. A process for treating rubber or similar material which comprises adding an organic dye, sulfur, amin, and a metallic oxid thereto, and vulcanizing the mixture at a temperature below 212° F.

12. A process for treating rubber or similar material, which comprises adding sulfur, an amin adapted to lower the temperature of vulcanization and a metallic oxid to said rubber and inducing vulcanization to take place under the action thereof at a temperature below 212° F.

13. As a new compound a vulcanized rubber comprising products of the action of a coloring material, a vulcanizing agent normally tending to injure the coloring material during vulcanization and an agent itself having no injurious effect upon the coloring material and adapted to prevent injury by the vulcanizing material.

14. As a new compound a vulcanized rubber comprising products of the action of a vulcanizing agent, a coloring material injured by said vulcanizing agent under normal conditions of vulcanization and a methylene base adapted to prevent such injury.

15. As a new compound a vulcanized rubber comprising products of the action of a dye, a vulcanizing agent normally tending to injure the dye under vulcanizing conditions and an agent itself having no injurious effect upon the coloring material and adapted to prevent injury by said vulcanizing material.

16. As a new compound a vulcanized rubber comprising products of the action of sulfur, a coloring material normally injured thereby under vulcanizing conditions and an agent itself having no injurious effect upon the coloring material and adapted to prevent injury by said sulfur.

17. As a new compound a vulcanized rubber comprising products of the action of sulfur, a dye normally injured thereby under vulcanizing conditions and a methylene base.

18. As a new compound a vulcanized rubber comprising products of the action of sulfur, an amin adapted to lessen the temperature of vulcanization, a metallic oxid, and color.

Signed at Petrograd, Russia, this 17th day of November, 1916.

IWAN OSTROMISLENSKY.